(Model.)
L. J. WING.
Ventilator.
No. 239,359. Patented March 29, 1881.
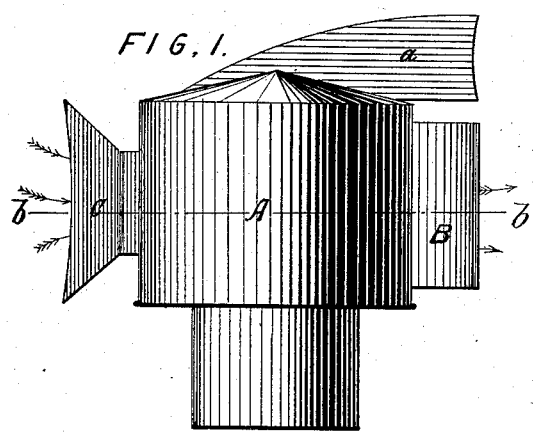
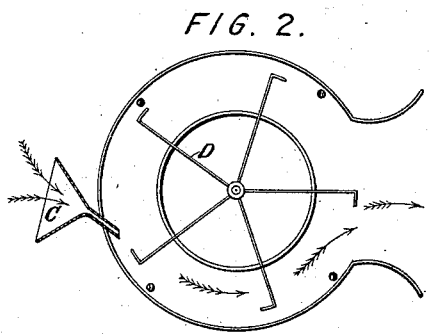
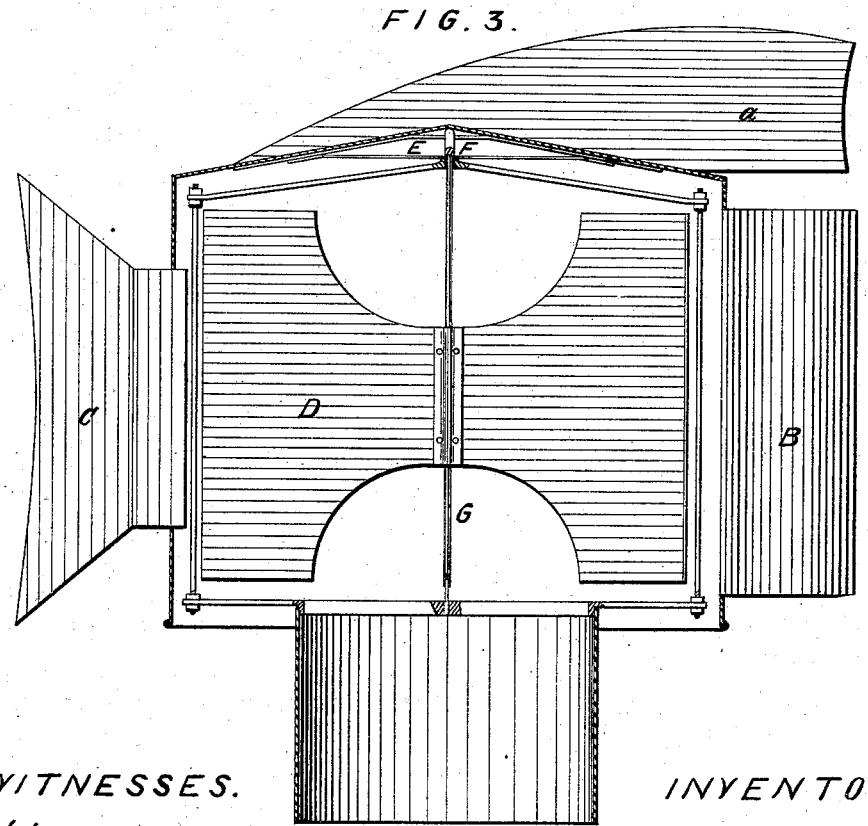
WITNESSES.
H. M. Darby
T. S. Carman
INVENTOR.
Levi J. Wing

UNITED STATES PATENT OFFICE.

LEVI J. WING, OF NEW YORK, N. Y.

VENTILATOR.

SPECIFICATION forming part of Letters Patent No. 239,359, dated March 29, 1881.

Application filed March 17, 1880. (Model.)

*To all whom it may concern:*

Be it known that I, LEVI J. WING, of the city of New York, county of New York, and State of New York, have invented a new and useful Improvement in Ventilators, of which the following is a specification.

This invention relates to an improvement in means for ventilating buildings, cars, steamships, sailing-vessels, factories, mines, &c.; and it consists, first, in the adaptation of an improved ventilator-fan operated or driven by the wind through a funnel and pipe in form and fact similar to a blow-pipe in place of or as a substitute for a wind-wheel, as used in my invention, for which a patent was allowed me May 27, 1879; and, second, in novel method of using a truss or support to better keep the revolving hood in position, as hereinafter described.

Figure 1 is an outside view of a complete ventilator. Fig. 2 is a cross-section taken through *b b* of Fig. 1. Fig. 3 is a vertical longitudinal section.

The vertical fans are placed within the enlarged revolving hood, as in my former invention; but in order to obtain an accelerated movement of the fan-blades, and at the same time to cheapen the construction of the ventilators, I dispense with the wind-wheel and introduce the wind through a funnel in the back or closed side of the hood A, drawn down to a small orifice or pipe, which is made of sufficient length and placed in proper position to throw the concentrated force of the wind upon the extreme end of the fan-blades, the ends of which are bent backward, so as to form a bucket. By this method I obtain great power for driving the fan with but little friction, as more particularly shown in Fig. 2, the action being as follows: The vane *a* holds the hood A, so that the flaring mouth and shields B are from the wind, and holds the open mouth of the funnel C toward the wind. The wind, entering the hood through the funnel and contracted pipe, strikes the back or bucket part of the fan-blades D, causing them to revolve rapidly. As each passes the open mouth of the hood it forces the air in front of it out through the opening, thus creating a partial vacuum, which, in turn, being filled by the air from within causes a strong draft or exhaust from the pipe, flue, or shaft to which the ventilator is attached.

The letter E, Fig. 3, represents the truss, the lower piece resting upon the raised center part of the frame held in position and revolving around the socket or spindle F, the socket or spindle extending upward and through the upper piece or part of the truss, thus making a firm and suitable bearing for the revolving hood. By placing a washer and nut upon the upper end of socket or spindle these ventilators may be placed inverted upon the bottom or lower side of buildings, cars, &c., and thus can be run upside down, creating a downward instead of on upward current, making them useful in cars or other places where such current is desired.

Having described my invention, I claim—

In combination with the revolving hood A, provided with vane *a*, and supported and turning upon socketed truss E and spindle F, the funnel-shaped tube C, vertical fans D, and shaft G, substantially as and for the purpose set forth.

LEVI J. WING.

Witnesses:
 BENJ. DARBY,
 HY. W. LE ROY.